United States Patent
Chen et al.

(10) Patent No.: US 12,322,165 B2
(45) Date of Patent: Jun. 3, 2025

(54) HARDENED DEEP NEURAL NETWORKS THROUGH TRAINING FROM ADVERSARIAL MISCLASSIFIED DATA

(71) Applicant: INTEL CORPORATION, Santa Clara, CA (US)

(72) Inventors: Li Chen, Hillsboro, OR (US); Ravi L. Sahita, Portland, OR (US)

(73) Assignee: Intel Corporation, Santa Clara, CA (US)

(*) Notice: Subject to any disclaimer, the term of this patent is extended or adjusted under 35 U.S.C. 154(b) by 933 days.

(21) Appl. No.: 17/093,938

(22) Filed: Nov. 10, 2020

(65) Prior Publication Data
US 2021/0081793 A1 Mar. 18, 2021

Related U.S. Application Data

(63) Continuation of application No. 15/640,470, filed on Jul. 1, 2017, now Pat. No. 10,839,291.

(51) Int. Cl.
| | |
|---|---|
| G06V 10/82 | (2022.01) |
| G06F 18/21 | (2023.01) |
| G06F 18/2413 | (2023.01) |
| G06N 3/02 | (2006.01) |
| G06N 3/045 | (2023.01) |
| G06N 3/08 | (2023.01) |
| G06N 3/086 | (2023.01) |
| G06N 3/088 | (2023.01) |

(Continued)

(52) U.S. Cl.
CPC ............ *G06V 10/82* (2022.01); *G06F 18/217* (2023.01); *G06F 18/24143* (2023.01); *G06N 3/02* (2013.01); *G06N 3/045* (2023.01); *G06N 3/08* (2013.01); *G06N 3/086* (2013.01); *G06N 3/088* (2013.01); *G06V 10/764* (2022.01); *G06V 10/776* (2022.01)

(58) Field of Classification Search
None
See application file for complete search history.

(56) References Cited

PUBLICATIONS

Rozsa et al., Adversarial Diversity and Hard Positive Generation, Proceedings of the IEEE conference on computer vision and pattern recognition workshops, 2016, pp. 25-32 (Year: 2016).*

(Continued)

*Primary Examiner* — Alan Chen
(74) *Attorney, Agent, or Firm* — KDW FIRM PLLC

(57) ABSTRACT

Various embodiments are generally directed to techniques for training deep neural networks, such as with an iterative approach, for instance. Some embodiments are particularly directed to a deep neural network (DNN) training system that generates a hardened DNN by iteratively training DNNs with images that were misclassified by previous iterations of the DNN. One or more embodiments, for example, may include logic to generate an adversarial image that is misclassified by a first DNN that was previously trained with a set of sample images. In some embodiments, the logic may determine a second training set that includes the adversarial image that was misclassified by the first DNN and the first training set of one or more sample images. The second training set may be used to train a second DNN. In various embodiments, the above process may be repeated for a predetermined number of iterations to produce a hardened DNN.

23 Claims, 11 Drawing Sheets

(51) Int. Cl.
    *G06V 10/764*     (2022.01)
    *G06V 10/776*     (2022.01)

(56) References Cited

PUBLICATIONS

Rozsa et al., Towards Robust Deep Neural Networks with BANG, arXiv: 1612.00138v1 [cs.CV] Dec. 1, 2016, pp. 1-9 (Year: 2016).*

Carlini et al., Towards Evaluating the Robustness of Neural Networks, arXiv:1608.04644v2 [cs.CR] Mar. 22, 2017, pp. 1-19 (Year: 2017).*

Kurakin et al., Adversarial Machine Learning At Scale, arXiv:1611.01236v2 [cs.CV] Feb. 11, 2017, pp. 1-17 (Year: 2017).*

Papernot et al., SoK: Towards the Science of Security and Privacy in Machine Learning, arXiv:1611.03814v1 [cs.CR] Nov. 11, 2016, pp. 1-19 (Year: 2016).*

Tamer et al., Ensemble Adversarial Training: Attacks and Defenses, arXiv:1705.07204v2 [stat.ML] May 30, 2017; Total pp. 15 (Year: 2017).*

\* cited by examiner

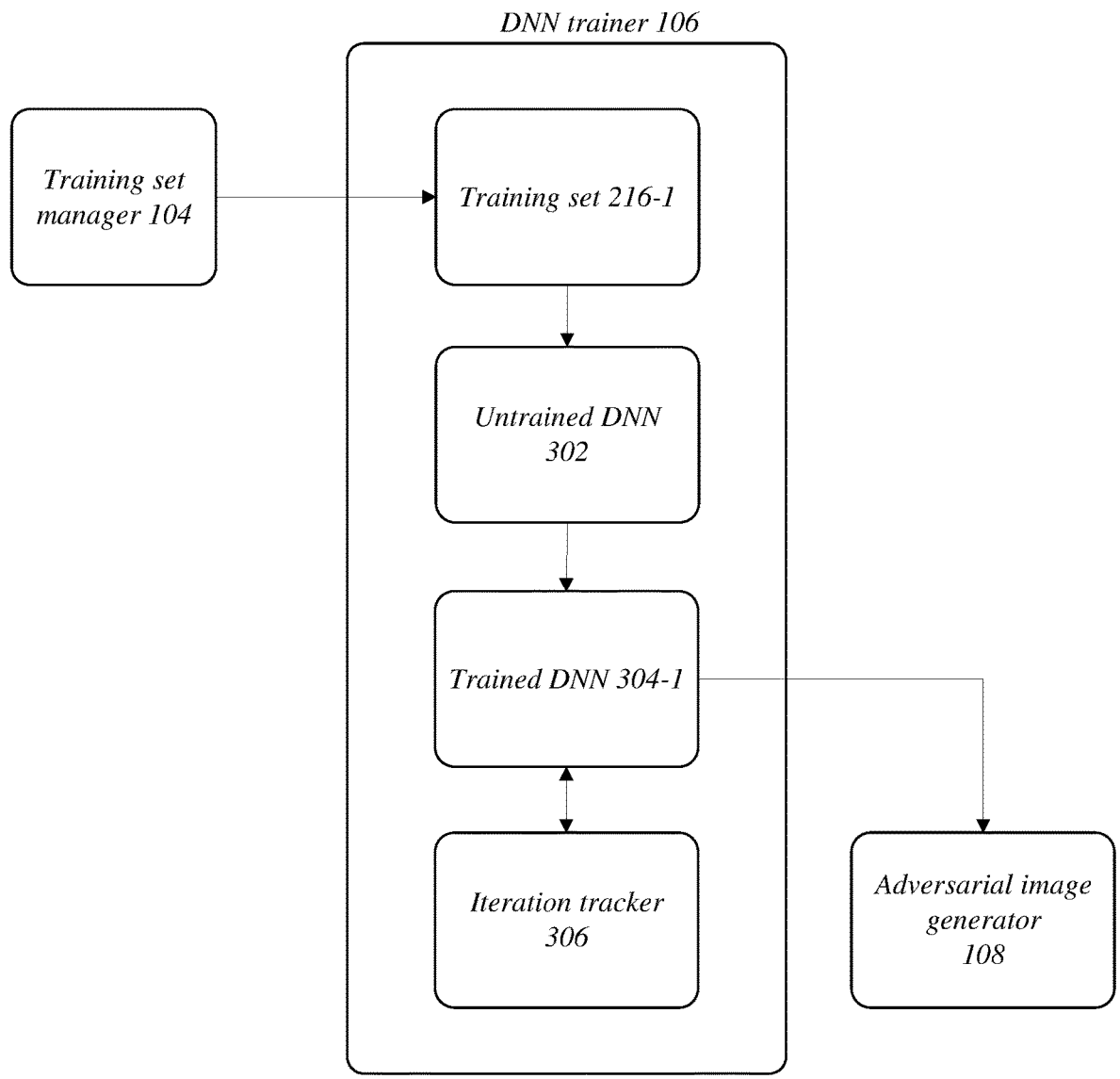

Storage Medium 700

Computer Executable Instructions for 500

Computer Executable Instructions for 600

*900*

HARDENED DEEP NEURAL NETWORKS THROUGH TRAINING FROM ADVERSARIAL MISCLASSIFIED DATA

CROSS-REFERENCE TO RELATED APPLICATIONS

This application is a continuation of, claims the benefit of and priority to previously filed U.S. patent application Ser. No. 15/640,470 filed Jul. 1, 2017, entitled "HARDENED DEEP NEURAL NETWORKS THROUGH TRAINING FROM ADVERSARIAL MISCLASSIFIED DATA", which is hereby incorporated by reference in its entirety.

BACKGROUND

Machine learning includes the study and construction of algorithms that can learn from and make predictions on data. Deep neural networks may implement algorithms to perform a type of machine learning referred to as deep learning. Typically, deep learning may utilize a cascade of many layers of artificial neurons, such as nonlinear processing units. Frequently, each successive layer uses the output of the previous layer as input. Collectively, the artificial neurons may perform feature extraction and transformation with deep learning algorithms. Deep learning may include supervised and unsupervised algorithms. Generally, unsupervised algorithms are used for pattern analysis and supervised algorithms are used for pattern classification.

BRIEF DESCRIPTION OF THE DRAWINGS

FIG. 3A illustrates an embodiment of a fourth operating environment.

FIG. 7 illustrates an embodiment of a storage medium.

DETAILED DESCRIPTION

Figure 1:
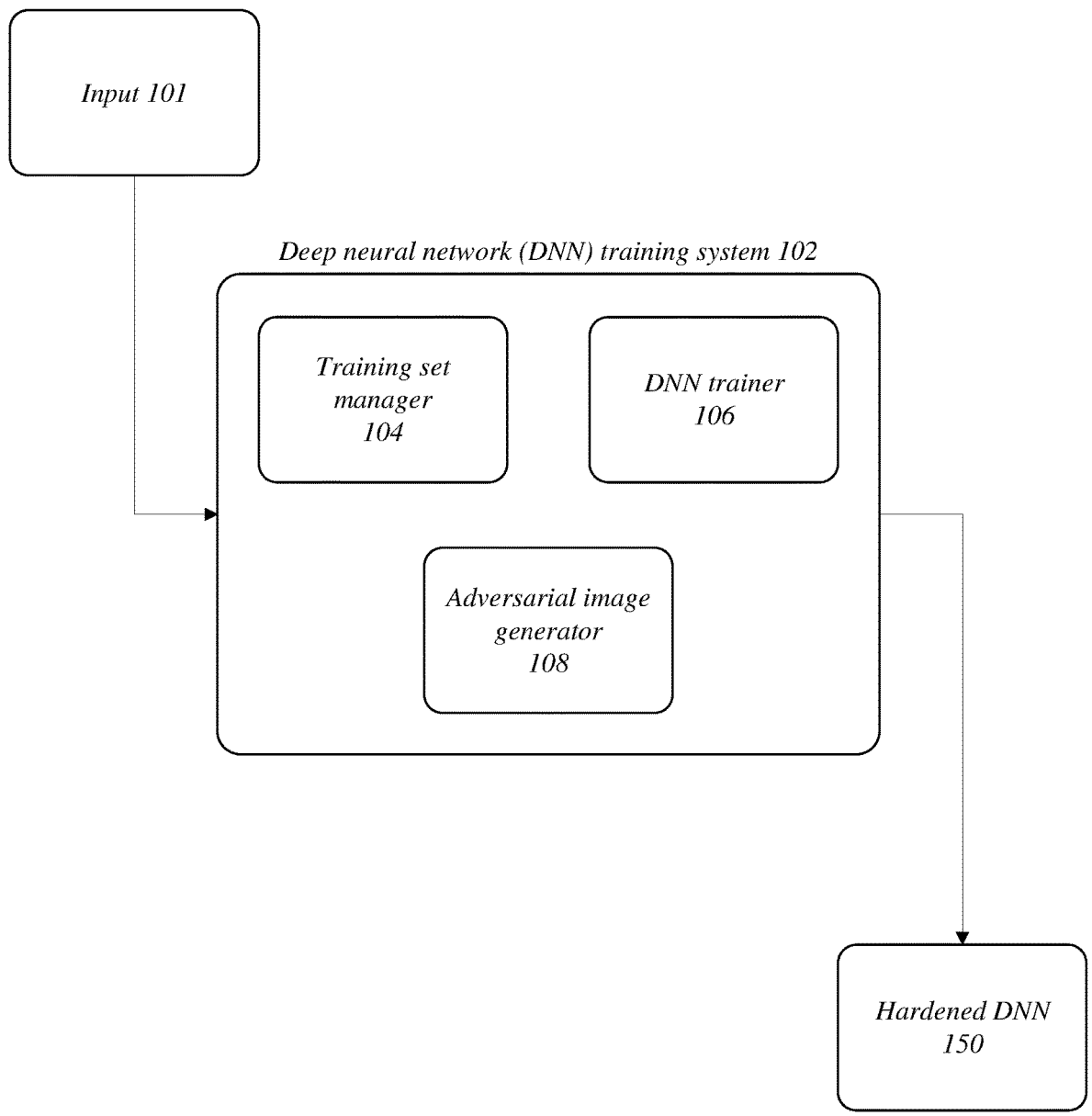
FIG. 1 illustrates an embodiment of a first operating environment.

Various embodiments are generally directed to techniques for training deep neural networks, such as with an iterative approach, for instance. Some embodiments are particularly directed to a deep neural network (DNN) training system that generates a hardened DNN by iteratively training DNNs with images that were misclassified by previous iterations of the DNN. In one or more embodiments, for example, an apparatus may comprise a memory and logic, at least a portion of the logic implemented in circuitry coupled to the memory. In one or more such embodiments, the logic may generate an adversarial image that is misclassified by a first DNN that was previously trained with a set of sample images. In some embodiments, the logic may determine a second training set that includes the adversarial image that was misclassified by the first DNN and the first training set of one or more sample images. In some such embodiments, the second training set may be used to train a second DNN. In various embodiments, the above process may be repeated for a predetermined number of iterations to produce a hardened DNN. These and other embodiments are described and claimed.

Some challenges facing DNNs include the inability to properly classify images in a reliable and efficient manner. These challenges may result from the inability of a DNN to properly identify an image that has had only a few pixels changed. For instance, an adversarial opponent may be able to craft an image, referred to as an adversarial image, that a DNN fails to properly classify. In such instances, this adversarial image may include a street sign that will be misclassified by DNNs, leading to accidents. Further, seemingly meaningless images may be misclassified by DNNs. For example, DNNs trained for image recognition may classify an image of seeming white noise as a cheetah. Adding further complexity, in various embodiments, DNNs may be used to detect malware. In some instances, adversarial opponents may be able to avoid detection by a DNN may altering minor or inconsequential portions of the malware code. These and other factors may result in DNNs with poor performance and limited adaptability. Such limitations can drastically reduce the capabilities, usability, and reliability of the DNN, contributing to inefficient systems with limited benefits.

Various embodiments described herein include a DNN training system that produces hardened DNNs through an iterative training process. In some embodiments, malware may be treated as images generated from bytecode. In some such embodiments, these images may be used to train a DNN to perform malware classification. In various embodiments, the DNN training system may generate adversarial images that are misclassified by the DNN trained to perform malware classification. In various such embodiments, the adversarial images may then be used to train a future DNN iteration. In this manner, improved classification accuracy, especially of adversarial images, may be achieved by a hardened DNN, leading to a more robust DNN. In one or more embodiments, image analysis for malware detection may reveal undetected relationships. For instance, malware images may display similarities with a family and dissimilarities across families. In some embodiments, feature extraction may be avoided by translating bytecode directly into pixel intensity for classification. In some such embodiments, avoiding features extraction in this way may improve efficiency while achieving high accuracy. In these and other ways the DNN training system may enable improved and more robust image classification, such as in malware detection, to achieve improved DNNs with stronger reliability, better flexibility, increased capabilities, and higher efficiencies, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an example of an operating environment 100 that may be representative of various embodiments. Operating environment 100 may include deep neural network (DNN) training system 102. In operating environment 100, DNN training system 102 may include training set manager 104, DNN trainer 106, and adversarial image generator 108. In one or more embodiments described herein, DNN training system 102 may receive input 101 and produce hardened DNN 150 based on the input. Embodiments are not limited in this context.

In various embodiments, the components of DNN training system 102 may interoperate to produce hardened DNN 150. In some embodiments, creating hardened DNN 150 may include generating adversarial samples (e.g., images) to attack a deep learning algorithm used for malware detection and/or performing iterative training on sequential DNNs with the adversarial samples. For example, training set manager 104 may determine a first training set based on input 101, DNN trainer 106 may then cause a first DNN to be trained to classify images using the first training set. In some such examples, adversarial image generator 108 may generate one or more adversarial images that are misclassified by the first DNN. In one or more embodiments, the one or more adversarial images may be generated using analytical attacks implemented by adversarial image generator 108. As will be described in more detail below, in one or more such embodiments, the analytical attacks implemented by adversarial image generator 108 may include causative attacks and evolution attacks.

In some embodiments, the one or more adversarial images that are misclassified by the first DNN may then be provided to training set manager 104 to include in a second training set. In various embodiments, the process of generating adversarial images, determining an updated training set, and training a DNN with the update training set may be repeated such that an iteration parameter is satisfied. For instance, input 101 may include an iteration parameter of five. In such instances, this may correspond to DNN training system 102 performing five rounds of generating adversarial images, determining an updated training set, and training a DNN with the updated training set. In one or more embodiments, the DNN trained with a training set that includes the last round of adversarial images generated may be output as hardened DNN 150.

Figure 2A:
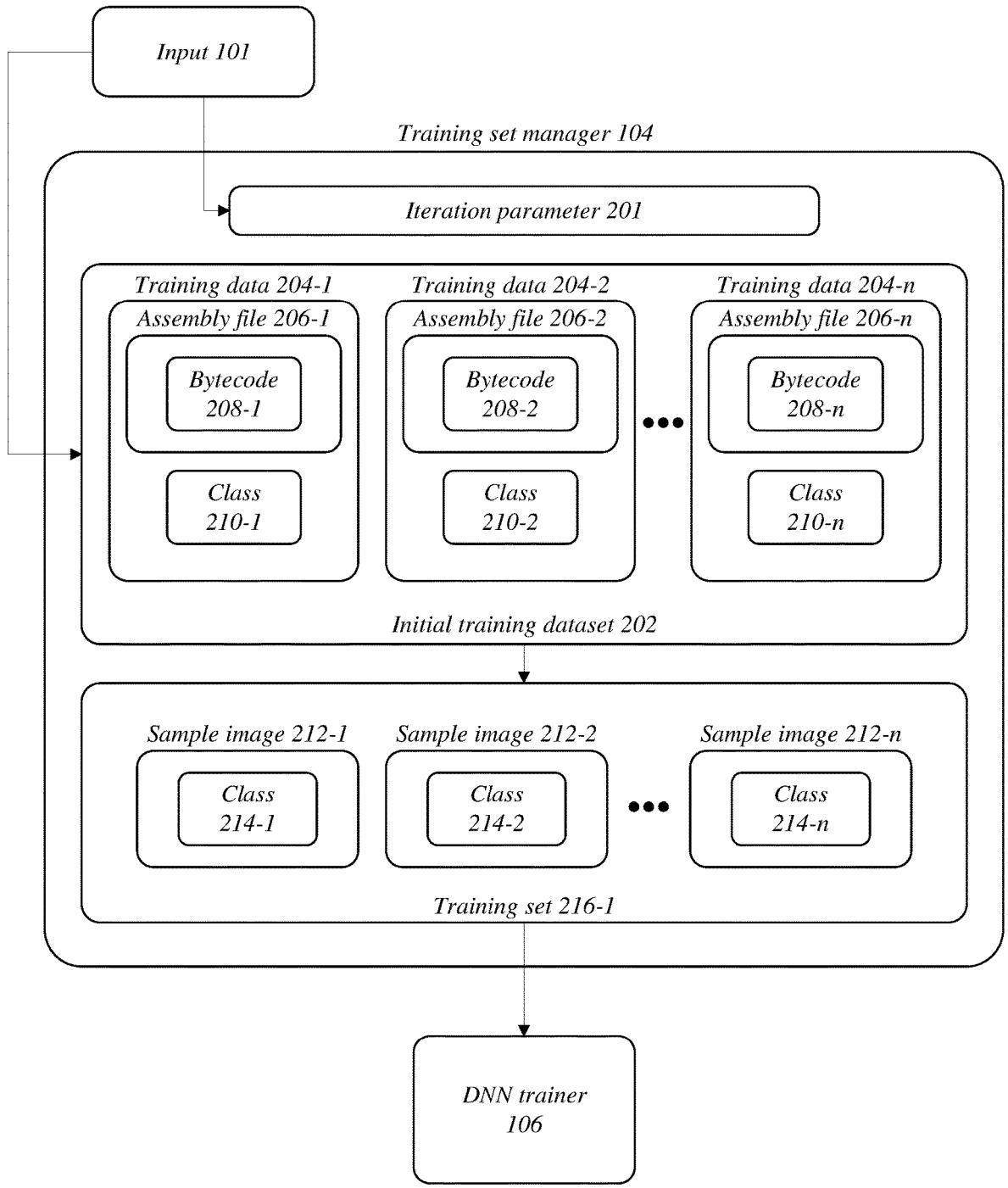
FIG. 2A illustrates an embodiment of a second operating environment.

FIG. 2A illustrates an example of an operating environment 200A that may be representative of various embodiments. Operating environment 200A may include training set manager 104 and DNN trainer 106. In operating environment 200A, training set manager 104 may receive iteration parameter 201 and initial training dataset 202 as input 101. In various embodiments described herein, training set manager 104 may convert initial training data set 202 into training set 216-1. In various such embodiments, training set 216-1 may be passed to DNN trainer and utilized to train a DNN. In some embodiments, iteration parameter 201 may determine how many different training sets are created for training DNNs. Embodiments are not limited in this context.

In one or more embodiments, initial training dataset 202 may include one or more pieces of training data 204-1, 204-2, 204-n (i.e., training data 204). In one or more such embodiments, some or all pieces of training data 204 in initial training dataset 202 may include an assembly file (e.g., assembly files 206-1, 206-2, 206-n or assembly files 206) comprising bytecode (e.g., bytecode 208-1, 208-2, 208-n or bytecode 208). In various embodiments, each piece of training data may be associated with a class (e.g. class 210-1, 210-2, 210-n or classes 210). In various such embodiments, the associations of class may be used in a deep learning algorithm to train a DNN. For instance, the DNN may be trained to detect malware. In such instances, the classes 210 may include 'malware' and 'non-malware'.

In various embodiments, training set manager 104 may convert initial training dataset 202 into training set 216-1. In various such embodiments, training data 204-1, 204-2, 204-n may be converted into sample images 212-1, 212-2, 212-n (i.e., sample images 212), respectively. In some embodiments, training set manager 104 may convert training data into sample images by directly translating the associated bytecode into pixel intensity. In one or more embodiments, sample images 212-1, 212-2, 212-n may include classes 214-1, 214-2, 214-n (i.e., classes 214), respectively. In one or more such embodiments, classes 214 may be the same or similar to the class (e.g., class 210-1, 210-2, 210-n) that corresponds to the bytecode used to create the sample image. In various embodiments, classes 210 may be a subset of classes 214. In other embodiments, classes 214 may be a subset of classes 210.

In some embodiments, training set manager 104 may receive initial training dataset 202 and iteration parameter 201 as input 101. In various embodiments, initial training dataset 202 may include uncontaminated data samples with K-classes. In one or more embodiments, iteration parameter 201 may include a 1-bit parameter, M, used to specify the number of iterations to harden the DNN. Once the initial training dataset 202 is converted into training set 216-1, training set 216-1 may be provided to DNN trainer 106 for training a first round DNN.

Figure 2B:
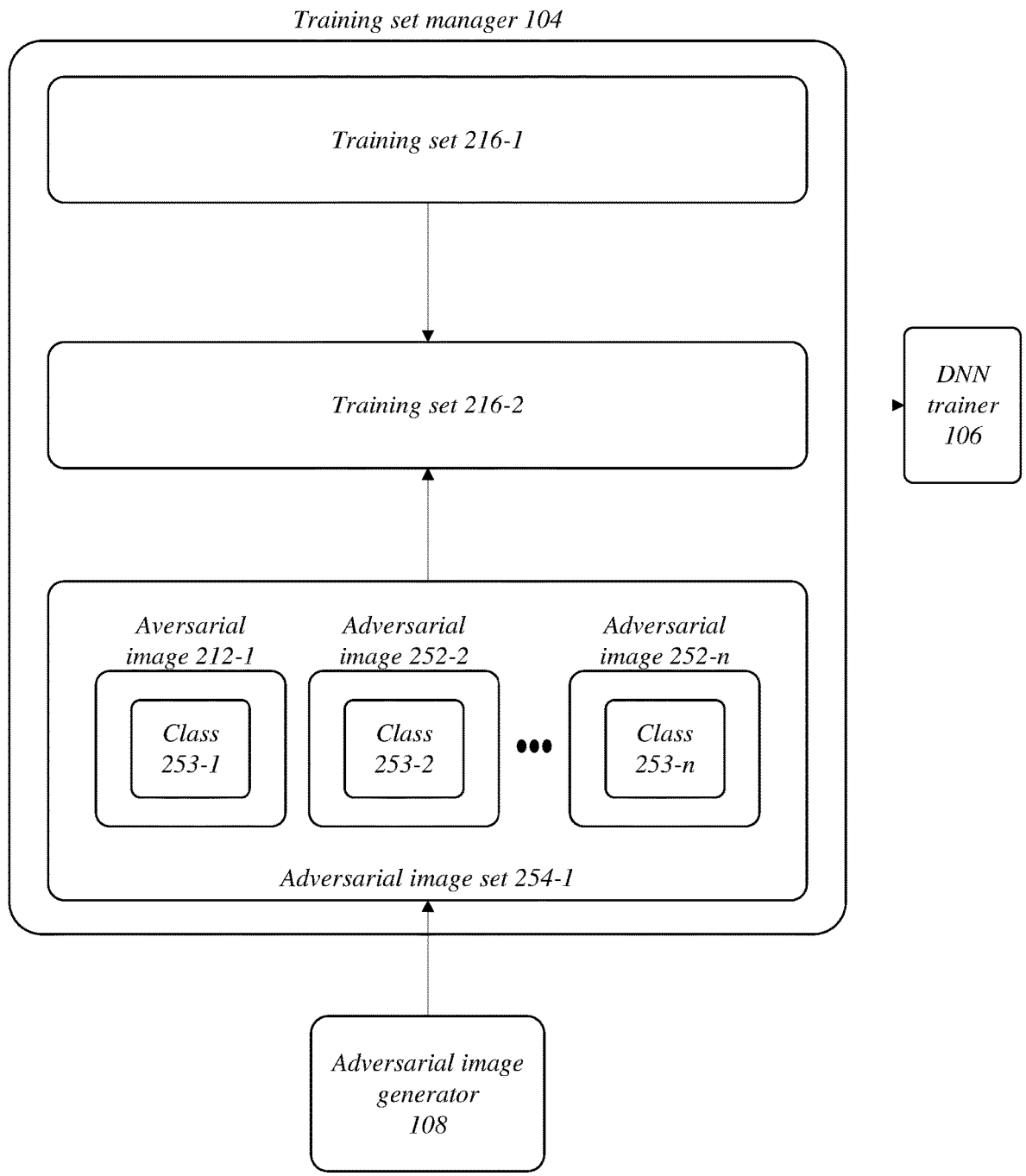
FIG. 2B illustrates an embodiment of a third operating environment.

FIG. 2B illustrates an example of an operating environment 200B that may be representative of various embodiments. Operating environment 200B may include training set manager 104, DNN trainer 106, and adversarial image generator 108. In operating environment 200B, training set manager 104 may determine training set 216-2 based on training set 216-1 and adversarial image set 254-1. Thus, in operating environment 200B, adversarial image set 254-1 was previously generated, such as by adversarial image generator 108, based on analytical attacks performed on a DNN trained with training set 216-1. Embodiments are not limited in this context.

In various embodiments, training set manager 104 may receive adversarial image set 254-1 from adversarial image generator 108. In one or more embodiments, adversarial images 252-1, 252-2, 252-$n$ may each be associated with a class 253-1, 253-2, 253-$n$ (i.e., classes 253), respectively. In one or more such embodiments, each of the classes 253 may be different from classes 210. Accordingly, in various embodiments, training set 216-2 may include K+1 classes, as opposed to the K classes of training set 216-1. For instance, classes 210 may include 'malware' or 'non-malware' while classes 253 include 'causative adversarial image' and 'evolution adversarial image'. In some embodiments, classes 253 may all be the same class, such as 'adversarial image'.

In some embodiments, training set manager 104 may determine training set 216-2 based on training set 216-1 and adversarial image set 254-1. In one or more embodiments described herein, training set manager 104 may include one or more sample images 212 of training set 216-1 and one or more adversarial images 252-1, 252-2, 252-$n$ (i.e., adversarial images 252) of adversarial image set 254-1 in training set 216-2. In various embodiments, training set 216-2 may include each sample image 212 of training set 216-1 and each adversarial image 252 of adversarial image set 254-1. In some embodiments, training set manager 104 may then provide training set 216-2 to DNN trainer 106 to train a second DNN.

FIG. 3A illustrates an example of an operating environment 300A that may be representative of various embodiments. Operating environment 300A may include training set manager 104, DNN trainer 106, and adversarial image generator 108. In operating environment 200A, DNN trainer 106 may receive training set 216-1 from training set manager 104. In the illustrated embodiments, DNN trainer 106 may include trainer set 216-1, untrained DNN 302, trained DNN 304-1, and iteration tracker 306. In various embodiments described herein, DNN trainer 106 may use training set 216-1 on an untrained DNN 302 to produce trained DNN 304-1. In various such embodiments, untrained DNN 302 may include a deep learning algorithm to which training set 216-1 is provided as input. In some such embodiments, based on the training set 216-1, the deep learning algorithm may generate trained DNN 304-1. Embodiments are not limited in this context.

In some embodiments, DNN trainer 106 may receive training set 216-1 from training set manager 104. In some such embodiments, training set 216-1 may be applied to untrained DNN 302 to produce trained DNN 304-1. In various embodiments, iteration tracker 306 may track the number of iterations DNN training system 102 has performed. In various such embodiments, iteration tracker 306 may determine the desired number of iterations based on iteration parameter 201. In operating environment 300A, iteration tracker 306 may determine more iterations are to be performed. For instance, iteration tracker 306 may include a counter that it initial set to match the iteration parameter 201. In such instances, each time a trained DNN is generated, the counter may be decremented. In some such instances, if the counter is above zero, the trained DNN may be provided to adversarial image generator 108. In other such instances, if the counter value is zero, the trained DNN may be output as hardened DNN 150.

In various embodiments, trained DNN 304-1 may be a convolutional neural network capable of classifying malware represented as images generated from corresponding bytecode. In various such embodiments, resizing the width and/or height of the images may not significantly affect classification accuracy. In some embodiments, trained DNN 304-1 may have a multi-layer perceptron architecture. In one or more embodiments, trained DNN 304-1 may perform a two-class classification task.

Figure 3B:
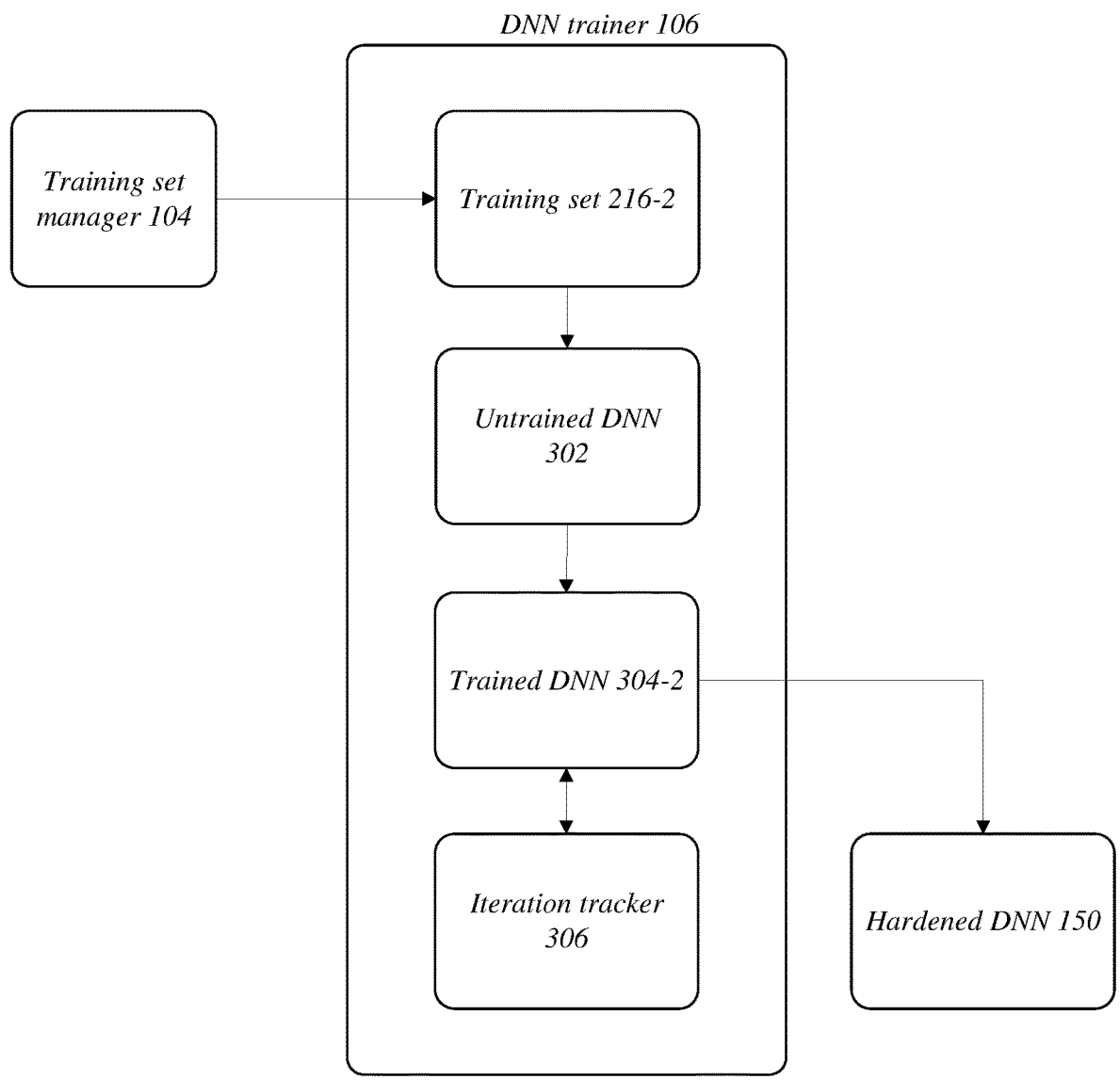
FIG. 3B illustrates an embodiment of a fifth operating environment.

FIG. 3B illustrates an example of an operating environment 300B that may be representative of various embodiments. Operating environment 300B may include training set manager 104 and DNN trainer 106. In operating environment 300B, DNN trainer 106 may utilize training set 216-2 received from training set manager 104 to generate trained DNN 304-2. In the illustrated embodiments, trained DNN 304-2 is output as hardened DNN 150. In such embodiments, trained DNN 304-2 may be output as hardened DNN 150 in response to iteration tracker 306 determine the appropriate number of iteration have been performed. Thus, in operating environment 200B, iteration parameter 201 was set to two. However, it will be appreciated that, in other embodiments, iteration parameter 201 may be set to any positive integer. Embodiments are not limited in this context.

Figure 4:
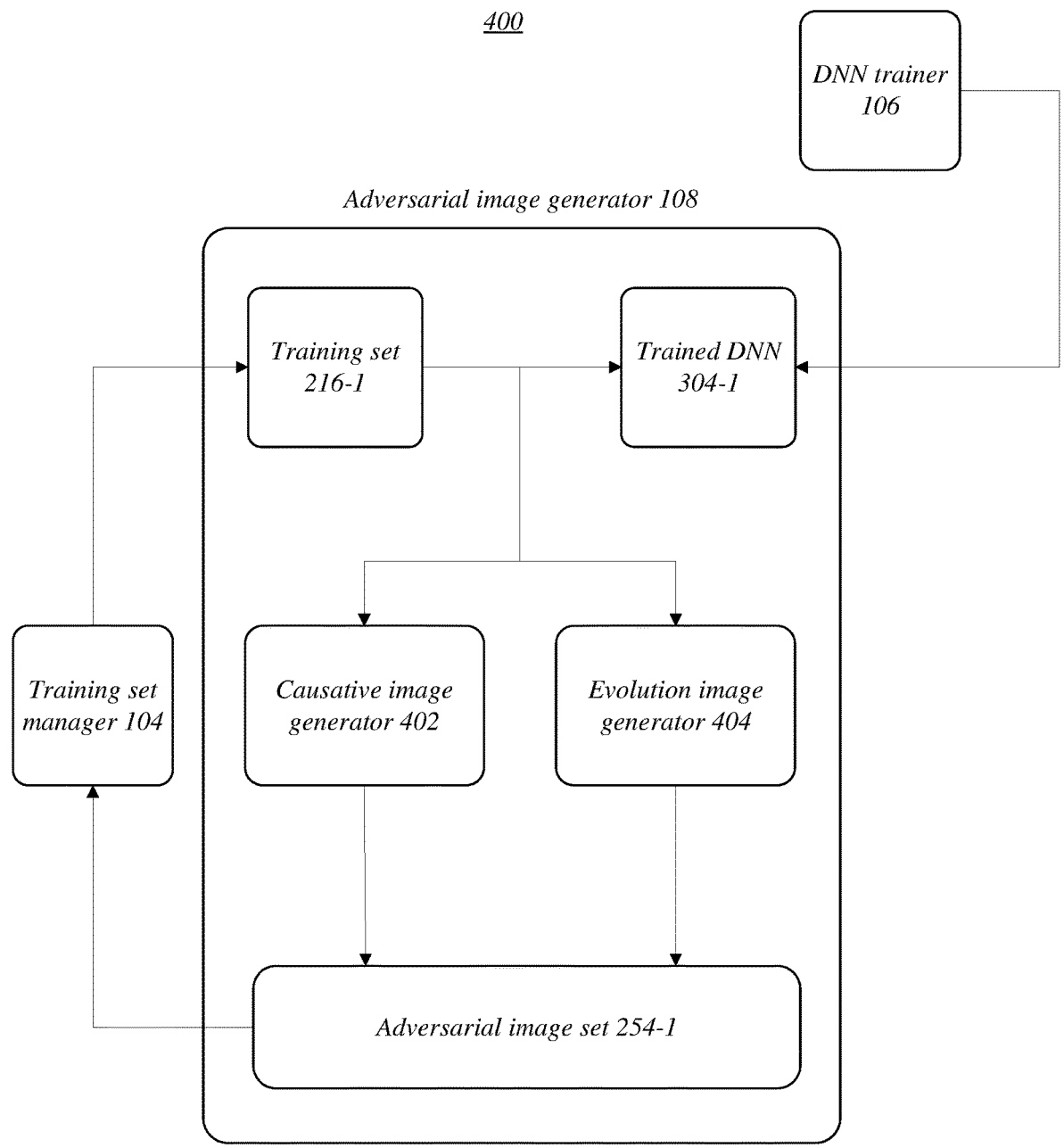
FIG. 4 illustrates an embodiment of a sixth operating environment

FIG. 4 illustrates an example of an operating environment 400 that may be representative of various embodiments. Operating environment 400 may include training set manager 104, DNN trainer 106, and adversarial image generator 108. In operating environment 400, adversarial image generator 108 may include causative image generator 402 and evolution image generator 404. In the illustrated embodiments, adversarial image generator 108 may receive training set 216-1 from training set manager 104 and trained DNN 304-1 from DNN trainer 106. In various embodiments described herein, causative image generator 402 and evolution image generator 404 may perform analytical attacks on trained DNN 304-1 to produce adversarial image set 254-1. It will be appreciated that adversarial image generator 108 an adversarial image set on any iteration of trained DNN. For instance, training set 216-2 and trained DNN 304-2 may be utilized by causative image generator 402 and evolution image generator 404 to produce an adversarial image set 254-2 (not shown). Embodiments are not limited in this context.

In one or more embodiments, causative image generator 402 may perform causative analytical attacks on trained DNN 304-1 to generate one or more adversarial samples or images in set 254-1 and/or evolution image generator 404 may perform evolution analytical attacks on trained DNN 304-1 to generate one or more adversarial images in set 254-1. Generally, the analytical attacks may include, for instance, altering one or more portions of a base image (e.g., sample image 212-$n$) to generate a test image; providing the test image to the trained DNN (e.g., trained DNN 304-1) for classification; and include the test image as an adversarial image (e.g., adversarial image 252-2) in adversarial image set 254-1 when the trained DNN classifies the test image as something different than target classification or class. In some embodiments, the target classification may be the class of the base image. In one or more embodiments, adversarial images or samples may come in two general varieties. In one or more such embodiments, the first variety may include malware samples that look very close to clean samples and the second variety may include clean samples that look very close to malware samples. In various embodiments, the first variety may pass undetected by an unhardened DNN and the second variety may increase false positives.

In some embodiments, causative image generator 402 may carry out a causative attack as follows. Given a valid input x (e.g., sample image 212-1), find a similar x' such that the classification output $C(x) \neq C(x')$, but x and x' are close according to some distance metric. In various embodiments, the causative attack seeks to change the smallest number of pixels, such as in sample image 212-2, that results in the trained DNN classifies x' different than x. In one or more embodiments, causative attacks may be implemented via a fast gradient sign method. In one or more such embodiments, the fast gradient sign method may be defined as $x' = x + \epsilon \cdot \text{sign}(\nabla \text{loss}_{F,t}(x))$. In some embodiments, the fast gradient sign method may enable quick and efficient generation of adversarial images. In various embodiments, causative attacks, such as those performed by causative image generator 402, may produce adversarial images that are classified as benign images.

In various embodiments, evolution image generator 404 may carry out an evolution attack as follows. Consider the collection of sample images (e.g., sample images 212) as a population. Given a valid input x, find a dissimilar x' using an evolution algorithm such that x' is white-noise, but classifies as a valid label by the trained DNN. In some embodiments, in each iteration, the evolution algorithm may choose a random organism (e.g., sample image 212-n), mutates it randomly, and replaces it based on optimizing a fitness function. In one or more embodiments, evolution attacks may be implemented using multi-dimensional archive of phenotypic elites (MAP-elites). In one or more such embodiments, the MAP-elites may enable simultaneous evolution on a population that contains individuals that score well.

In one or more embodiments, the analytical attacks and/or adversarial images may become guidance on changing or injecting code in the assembly file (e.g., assembly file 206-2). In one or more such embodiments, changing or injecting code in an assembly file may be targeted at avoiding being classified as malware by the trained DNN. In one or more such embodiments, the position in the assembly file may be approximated using a sliding window technique on the images. In various embodiments, the sliding window technique may be used on the base image (e.g., sample image that misclassified test image is based on). In various such embodiments, the perturbed or altered portion may be the patch identified by the sliding window technique. In some embodiments, this may be used to determine which portion of the bytecode has the heaviest weight when it comes to the trained DNN making a prediction.

In various embodiments, if the patch is larger, it may contain places for code injection in the corresponding assembly file. In one or more embodiments, the position identified in a base image by the sliding window technique are pixels that do not map exactly back to the assembly file, which is text. Accordingly, in one or more such embodiments, the portion identified by the sliding window technique approximates the portions of the assembly file that has bytecode that needs to be changed. In some embodiments, validity of code modifications/injections may be evaluated using symbolic execution. In some such embodiments, the deep learning algorithm's accuracy may decrease and false positive rate may include when adversarial images are included for classification.

In some embodiments, DNN training system 102 may be targeted at enhancing deep learning resiliency against analytical attacks. Hence, as a defense mechanism, DNN training system 102 may rebuild iterative layers of DNNs and/or utilize the adversarial images to enhance robustness of the deep learning algorithm. In one or more embodiments, operation of DNN training system 102 may proceed as follows. The inputs (e.g., input 101) to the first DNN, DNN1, may be uncontaminated data samples or images with K classes and a 1-bit parameter M to specific the number of iterations to harden the DNN (e.g., iteration parameter 201). DNN1 may be trained on the uncontaminated data samples. The DNN training system 102 may then generate adversarial examples, such as ones constructed by causative and evolution attacks. These attacks may modify the uncontaminated data samples (e.g., base images) slightly to produce test images. When DNN1 classifies a test image in a wrong class (e.g., not the target class), the test image may be identified as an adversarial image and included in an adversarial image set (e.g., adversarial image set 254-1). In some embodiments, the adversarial images may be added to a subsequent training set (e.g., training set 216-2) as a new class. In such embodiments, training set 216-2 would have K+1 classes.

In one or more embodiments, a second DNN, DNN2, may be trained on training set 216-2. In one or more such embodiments, causative image generator 402 and evolution image generator 404 may then perform analytical attacks on DNN2. In various embodiments, DNN training system 102 may repeat the process until the number of iterations M is reached. For example, in malware analysis, the inputs may be the malware images and an iteration parameter of 8. In such examples, DNN1 may be trained on the collection of malware images. In some embodiments, a 2-layer perceptron (2-MLP) may be utilized. In some such embodiments, the 2-MLP may be utilized based on speed considerations.

In some embodiments, depending on data size, different architectures for the DNNs may be utilized. For instance, for MLP, the number of layers may be varied. In another instance, for LeNet, filter sizes may be changed. In one or more embodiments, the DNN training system 102 may then launch adversarial attacks using causative and evolution attacks to determine adversarial images. In various embodiments, implementation of the causative attack may be based on minimizing an L-infinity or Chebyshev distance of an adversarial image. In some embodiments, the perturbed or altered portion may become guidance on changing associated bytecode. In some such embodiments, the position in the assembly file of the bytecode may be approximated via a sliding window technique performed on the images. In one or more embodiments, validity may be evaluated using symbolic execution. In various embodiments, after validation, a new training set is created that includes the adversarial images, and thus the resulting training set has K+1 classes. In various such embodiments, DNN2 may be trained on the resulting training set with K+1 classes, and repeat this process until DNN8 is trained. In some embodiments, DNN8 may be output as hardened DNN 150. In one or more embodiments, classification of adversarial images may improve within five iterations.

In various embodiments, the DNN training system 102 can defend a variety of analytical attacks on deep learning. In some embodiments, DNN training system 102 may be applicable to improve the resiliency of deep learning used in one or more of autonomous driving, computer vision, speech recognition, the internet of things, and malware detection. For example, with respect to autonomous driving, when the camera of the autonomous vehicle takes a real-world image, but an attack perturbs the smallest number of pixels in the image, then an unhardened machine learning algorithm used by the vehicle is likely to misclassify the image. In such examples, this misclassification can lead to accidents. Accordingly, in one or more embodiments, DNN training system 102 may prevent dangerous consequences resulting from a misclassification from happening. In various embodiments, overcoming adversarial images with DNN training system 102 can avoid security problems and/or give deep learning algorithms a more accurate understanding of the tasks they solve.

Figure 5:
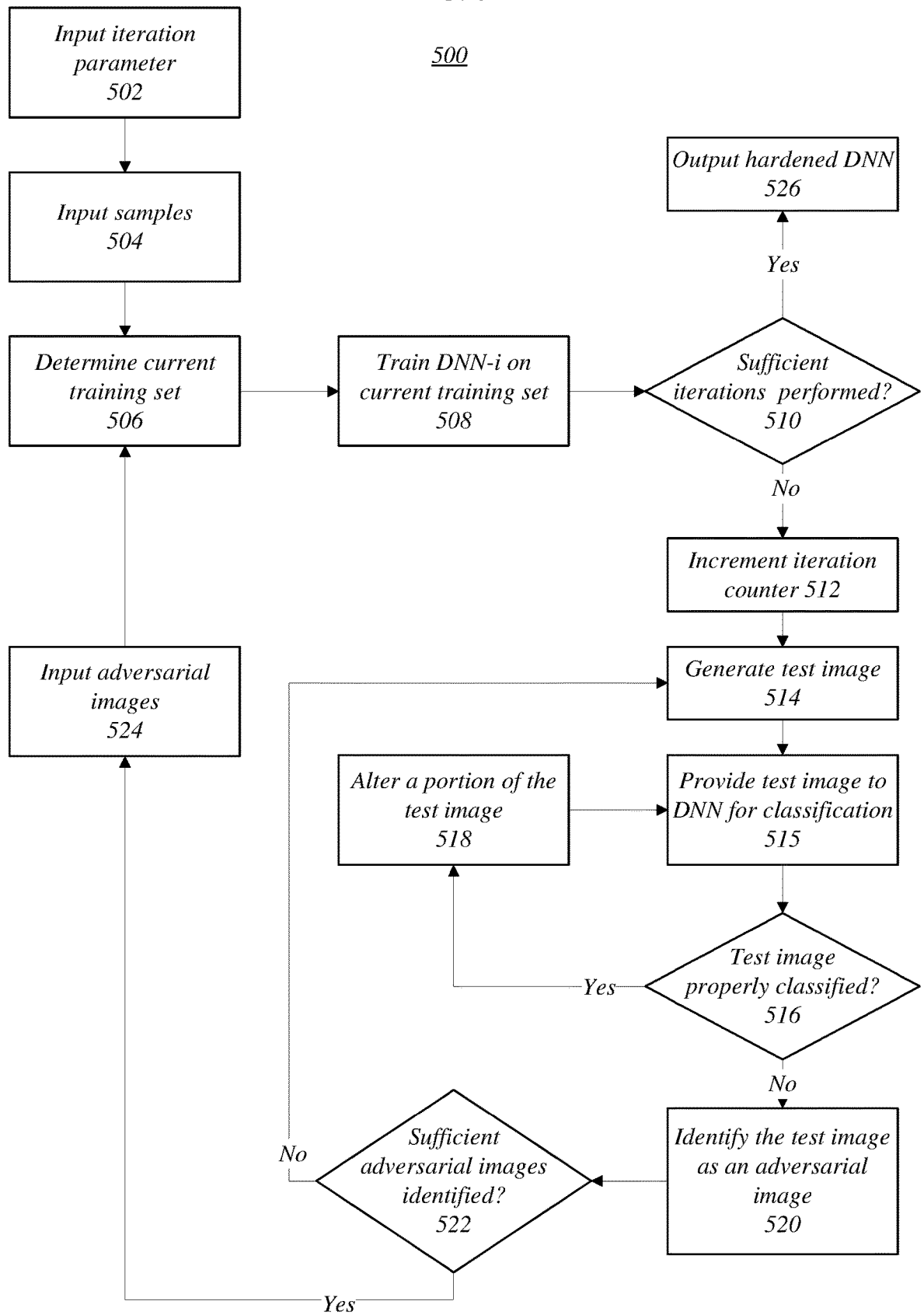
FIG. 5 illustrates an embodiment of a first logic flow.

FIG. 5 illustrates one embodiment of a logic flow 500, which may be representative of operations that may be executed in various embodiments, such as in conjunction with generating hardened DNN 150. The logic flow 500 may be representative of some or all of the operations that may be executed by one or more components of operating environments 100, 200, 300, 400 of FIGS. 1-4, such as DNN training system 102, training set manager 104, DNN training 106, or adversarial image generator 108. The embodiments are not limited in this context.

In the illustrated embodiment shown in FIG. 5, the logic flow 500 may begin at block 502. At block 502 "input iteration parameter" an iteration parameter may be received as input. For instance, training set manager 104 may receive iteration parameter 201 in input 101. Proceeding to block 504 "input samples" samples may be received as input. For example, training set manager 104 may receive initial training dataset 202 as input samples in input 101.

At block 506 "determine current training set" a current training set may be determined. For instance, training set 216-1 may be determined from initial training dataset 202. In various embodiments, training set 216-1 may include one or more sample images. In some embodiments, training set manager 104 may convert bytecode into pixel intensity to generate the sample images. For example, bytecode 208-1 may be translated into pixel intensity to generate sample image 212-1.

Continuing to block 508 "train DNN-i on current training set" the current iteration of DNN may be trained on the current training set. For instance, trained DNN 304-1 may be generated based on training set 216-1. In some embodiments, the current training set may be input to an untrained DNN (e.g., untrained DNN 302) to generate the current trained DNN (e.g., trained DNN 304-1).

At block 510 "sufficient iterations performed?" it may be determined whether a sufficient number of iterations have been performed. For instance, iteration tracker 306 may count the number of iterations performed and compare it to iteration parameter 201. If sufficient iterations have been performed, the current DNN may be output as hardened DNN 150. On the other hand, if sufficient iterations have not been performed, the iteration count may be incremented at block 512 and logic flow 500 may proceed to block 514.

At block 514 "generate test image" a test image may be generated. For example, one or more portions of a sample image may be altered to generate a test image. Proceeding to block 515 "provide test image to DNN for classification" the test image may be provided to the DNN for classification. Continuing to block 516 "test image properly classified?" it may be determined if the test image was properly classified by the DNN. For instance, if the classification of the test image matches a target classification, the test image is properly classified. However, if the classification of the test image does not match the target classification, the test image is improperly classified.

Figure 6:
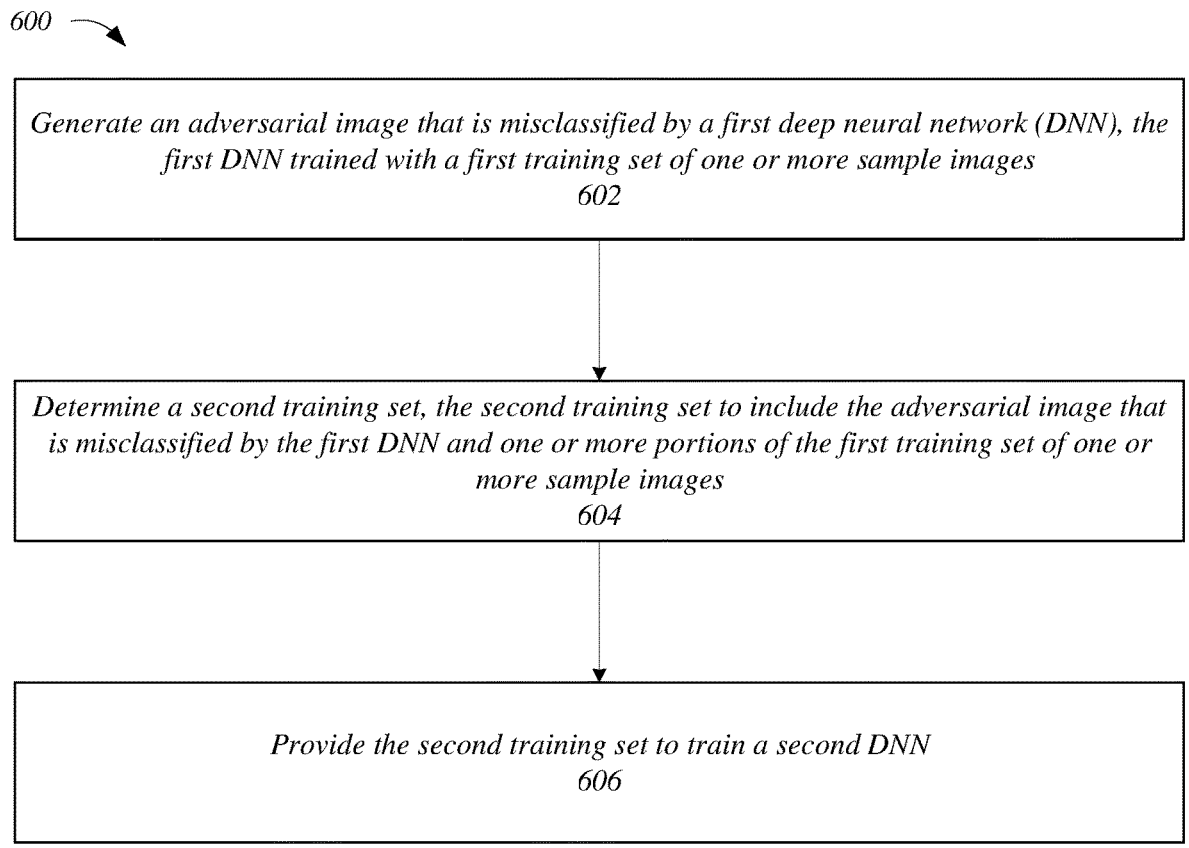
FIG. 6 illustrates an embodiment of a second logic flow.

When the test image is properly classified, logic flow 500 may proceed to block 518. At block 518 "alter a portion of the test image" a portion of the properly classified test image is altered, and the altered test image is resubmitted to the DNN for classification at block 515. Referring back to block 516, when the test image is not properly classified, the test image may be identified as an adversarial image at block 520. Continuing to block 522 "sufficient adversarial images identified?" it may be determined if sufficient adversarial images have been identified for the current iteration. If sufficient adversarial images have not been identified, logic flow 500 may return to block 514 "generate test image". However, if sufficient adversarial images have been identified, logic flow 500 may proceed to block 524 "input adversarial images". At block 524, the adversarial images may be provided as input to block 506 "determine current training set". Accordingly, the current training set may be updated with the adversarial images when logic flow 500 returns to block 506 from block 526. In various embodiments, this may enable the next iteration of DNN hardening to begin FIG. 6 illustrates one embodiment of a logic flow 600, which may be representative of operations that may be executed in various embodiments, such as in conjunction with generating hardened DNN 150. The logic flow 500 may be representative of some or all of the operations that may be executed by one or more components of operating environments 100, 200, 300, 400 of FIGS. 1-4, such as DNN training system 102, training set manager 104, DNN training 106, or adversarial image generator 108. The embodiments are not limited in this context.

In the illustrated embodiment shown in FIG. 6, the logic flow 600 may begin at block 602. At block 602 "generate an adversarial image that is misclassified by a first deep neural network (DNN), the first DNN trained with a first training set of one or more sample images" an adversarial image that is misclassified by a first DNN trained on a first training set of one or more sample images. For instance, adversarial image 252-1 may be generated by adversarial image generator 108 based on trained DNN 304-1 improperly classifying the adversarial image 252-1. In some instances, adversarial image 252-1 may be produced by altering one or more portions of a base image, such as sample image 212-1.

Proceeding to block 604 "determine a second training set, the second training set to include the adversarial image that is misclassified by the first DNN and one or more portions of the first training set of one or more sample images" a second training set that includes the adversarial image that is misclassified by the first DNN and one or more portions of the first training set of one or more samples images is determined. For example, training set manager 104 may determine training set 216-2 to include training set 216-1 and adversarial image set 254-1.

At block 606 "provide the second training set to train a second DNN" the second training set may be provided to train a second DNN. For instance, training set 216-2 may be input to untrained DNN 302 to produce trained DNN 304-2. In various embodiments, the trained DNN 304-2 may be output by DNN training system 102 as hardened DNN 150.

In various such embodiments, this may be based on a determination by iteration tracker 306 that iteration parameter 201 has been satisfied.

FIG. 7 illustrates an embodiment of a storage medium 700. Storage medium 700 may comprise any non-transitory computer-readable storage medium or machine-readable storage medium, such as an optical, magnetic or semiconductor storage medium.

In various embodiments, storage medium 700 may comprise an article of manufacture. In some embodiments, storage medium 700 may store computer-executable instructions, such as computer-executable instructions to implement one or more of logic flows or operations described herein, such as with respect to logic flows 500 and 600 of FIGS. 4 and 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
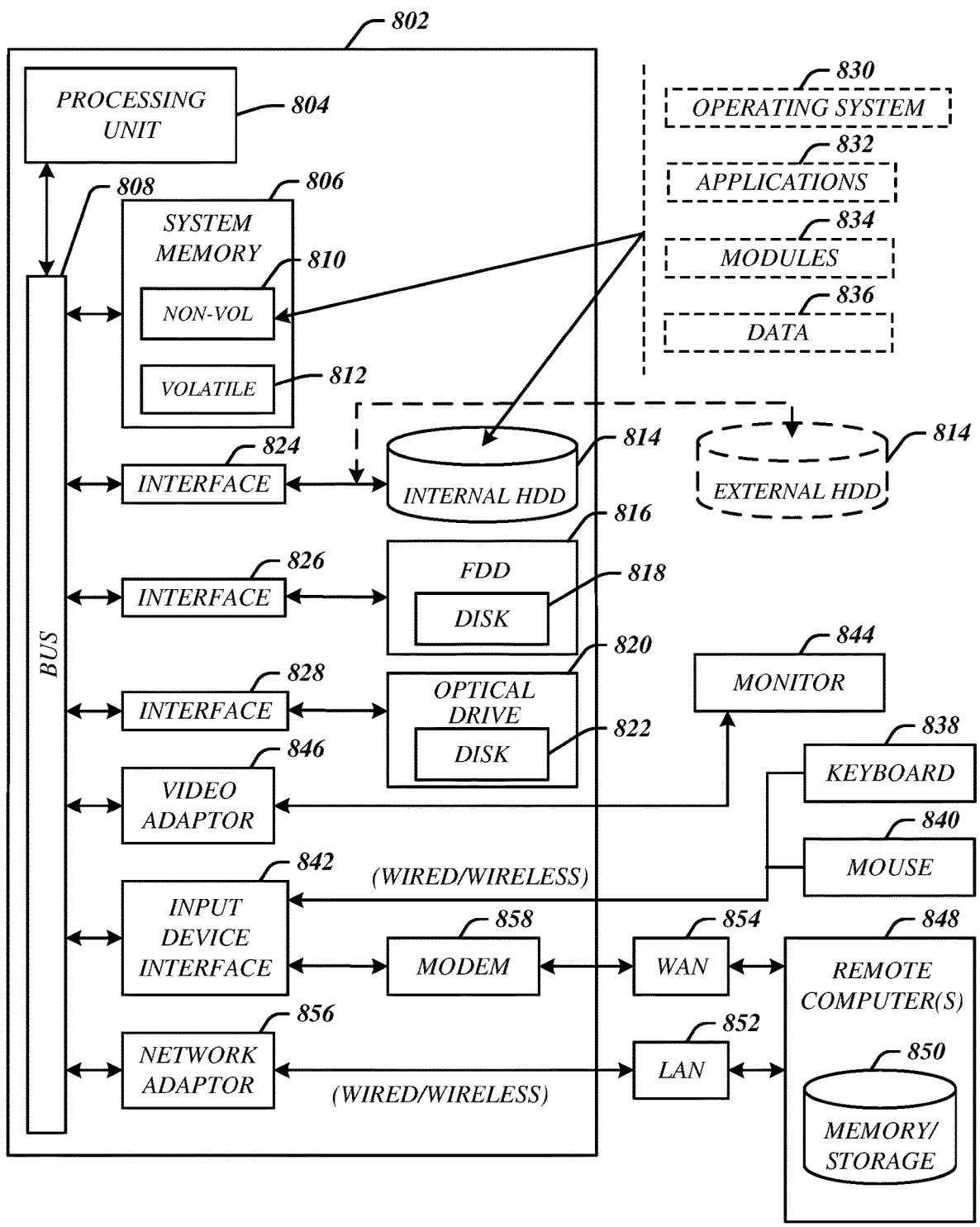
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a computer system that implements one or more components of operating environments 100, 200, 300, 400 of FIGS. 1-4. In some embodiments, computing architecture 800 may be representative, for example, of one or more portions or components of DNN training system 102 that implement one or more embodiments described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 994 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the DNN training system 102, such as one or more portions of training set manager 104, DNN trainer 106 and/or adversarial image generator 108.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 1358, or is connected to a communications server on the WAN 1354, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
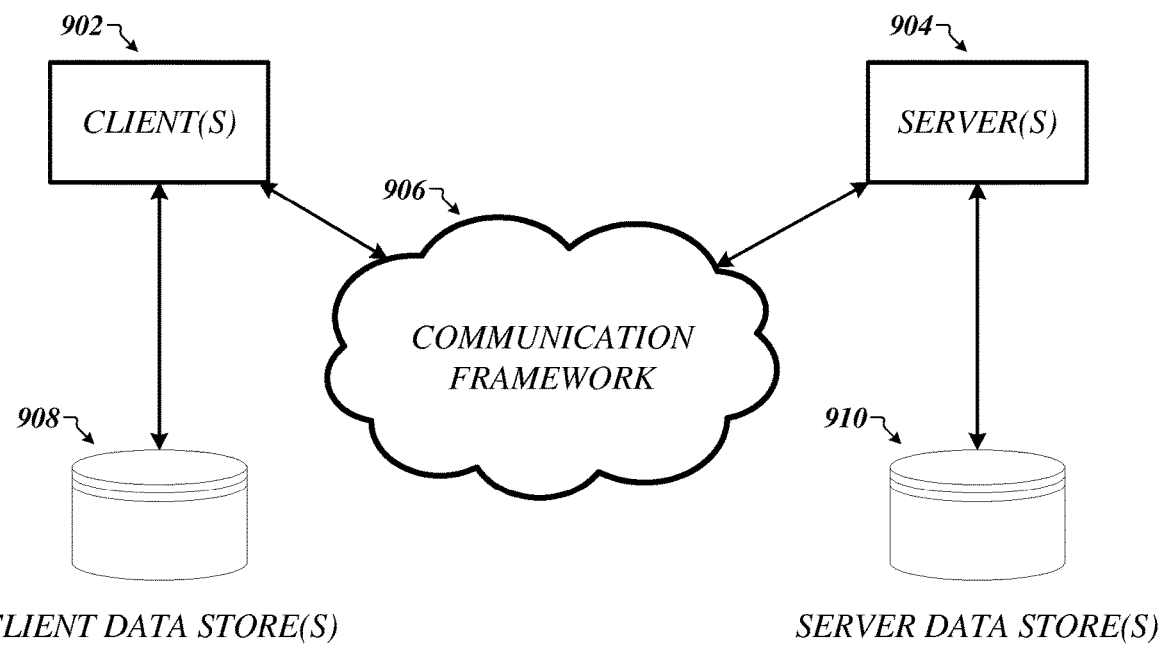
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network.

A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus to perform analytical attacks, the apparatus comprising: a memory; and logic, at least a portion of the logic implemented in circuitry coupled to the memory, the logic to: generate an adversarial image that is misclassified by a first deep neural network (DNN), the first DNN trained with a first training set of one or more sample images; determine a second training set, the second training set to include the adversarial image that is misclassified by the first DNN and one or more portions of the first training set of one or more sample images; and provide the second training set to train a second DNN.

Example 2 includes the subject matter of Example 1, generation of the adversarial image that is misclassified by the first DNN to include logic to: alter one or more portions of a base image to generate a test image; provide the test image to the first DNN for classification; and identify the test image as the adversarial image that is misclassified by the first DNN when classification of the test image is different from a target classification.

Example 3 includes the subject matter of Example 2, generation of the adversarial image that is misclassified by the first DNN to include logic to identify the test image as the adversarial image that is misclassified by the first DNN when classification of the test image is different from the target classification and the classification of the test image is associated with a confidence level that satisfies a threshold confidence level.

Example 4 includes the subject matter of Example 2, generation of the adversarial image that is misclassified by the first DNN to include logic to alter one or more portions of the test image when classification of the test image is the same as the target classification.

Example 5 includes the subject matter of Example 2, the logic to alter one or more portions of bytecode in an assembly file used to generate the base image based on the one or more altered portions of the base image when classification of the test image is different from the target classification.

Example 6 includes the subject matter of Example 5, the logic to identify the one or more portions of the bytecode to alter based on a sliding window technique.

Example 7 includes the subject matter of Example 6, the sliding window technique to utilize the one or more altered portions of the base image and the base image.

Example 8 includes the subject matter of Example 2, the base image comprising a sample image in the first training set and the target classification comprising a classification of the sample image.

Example 9 includes the subject matter of Example 8, wherein the base image and the test image are close according to a distance metric.

Example 10 includes the subject matter of Example 2, the target classification comprising a classification that is associated with white noise, a classification that is different from any classification associated with the first training set, or a classification of unclassifiable.

Example 11 includes the subject matter of Example 2, generation of the adversarial image that is misclassified by the first DNN to include logic to utilize a fast gradient sign method to alter the one or more portions of the base image to generate the test image.

Example 12 includes the subject matter of Example 2, generation of the adversarial image that is misclassified by the first DNN to include logic to utilize an evolution algorithm to alter the one or more portions of the base image to generate the test image.

Example 13 includes the subject matter of Example 12, the evolution algorithm to utilize a multi-dimensional archive of phenotypic elites.

Example 14 includes the subject matter of Example 2, generation of the adversarial image that is misclassified by the first DNN to include logic to minimize a Chebyshev or L-infinity distance between the base image and the test image when the one or more portions of the base image are altered to generate the test image.

Example 15 includes the subject matter of Example 1, the first and second DNNs trained to detect malware.

Example 16 includes the subject matter of Example 1, at least one sample image in the first training set generated from bytecode.

Example 17 includes the subject matter of Example 16, the logic to translate the bytecode into pixel intensity to generate the at least one sample image in the first training set.

Example 18 includes the subject matter of Example 16, the bytecode comprising malware bytecode.

Example 19 includes the subject matter of Example 1, the logic to: generate a second adversarial image that is misclassified by the second DNN; determine a third training set, the third training set to include the second adversarial image that is misclassified by the second DNN and one or more portions of the second training set; and provide the third training set to train a third DNN.

Example 20 includes the subject matter of Example 19, the one or more portions of the second training set to include the adversarial image that is misclassified by the first DNN.

Example 21 includes the subject matter of Example 19, the one or more portions of the second training set to include at least one of the one or more sample images in the first training set.

Example 22 includes the subject matter of Example 1, the first and second DNNs to utilize a multilayer perceptron architecture.

Example 23 includes the subject matter of Example 22, the logic to alter a number of layers in the multilayer perceptron architecture.

Example 24 includes the subject matter of Example 1, the first and second DNNs to utilize a convolutional neural network architecture.

Example 25 includes the subject matter of Example 24, the logic to alter a filter size in the convolutional neural network.

Example 26 is at least one non-transitory computer-readable medium comprising a set of instructions that, in response to being executed at a computing device, cause the computing device to: generate an adversarial image that is misclassified by a first deep neural network (DNN), the first DNN trained with a first training set of one or more sample images; determine a second training set, the second training set to include the adversarial image that is misclassified by the first DNN and one or more portions of the first training set of one or more sample images; and provide the second training set to train a second DNN.

Example 27 includes the subject matter of Example 26, generation of the adversarial image that is misclassified by the first DNN comprising instructions that, in response to being executed at the computing device, cause the computing device to: alter one or more portions of a base image to generate a test image; provide the test image to the first DNN for classification; and identify the test image as the adversarial image that is misclassified by the first DNN when classification of the test image is different from a target classification.

Example 28 includes the subject matter of Example 27, generation of the adversarial image that is misclassified by the first DNN comprising instructions that, in response to being executed at the computing device, cause the computing device to identify the test image as the adversarial image that is misclassified by the first DNN when classification of the test image is different from the target classification and the classification of the test image is associated with a confidence level that satisfies a threshold confidence level.

Example 29 includes the subject matter of Example 27, generation of the adversarial image that is misclassified by the first DNN comprising instructions that, in response to being executed at the computing device, cause the computing device to alter one or more portions of the test image when classification of the test image is the same as the target classification.

Example 30 includes the subject matter of Example 27, comprising instructions, that in response to being executed at the computing device, cause the computing device to alter one or more portions of bytecode in an assembly file used to generate the base image based on the one or more altered portions of the base image when classification of the test image is different from the target classification.

Example 31 includes the subject matter of Example 30, comprising instructions, that in response to being executed at the computing device, cause the computing device to identify the one or more portions of the bytecode to alter based on a sliding window technique.

Example 32 includes the subject matter of Example 31, the sliding window technique to utilize the one or more altered portions of the base image and the base image.

Example 33 includes the subject matter of Example 27, the base image comprising a sample image in the first training set and the target classification comprising a classification of the sample image.

Example 34 includes the subject matter of Example 33, wherein the base image and the test image are close according to a distance metric.

Example 35 includes the subject matter of Example 27, the target classification comprising a classification that is associated with white noise, a classification that is different from any classification associated with the first training set, or a classification of unclassifiable.

Example 36 includes the subject matter of Example 27, generation of the adversarial image that is misclassified by the first DNN comprising instructions that, in response to being executed at the computing device, cause the computing device to utilize a fast gradient sign method to alter the one or more portions of the base image to generate the test image.

Example 37 includes the subject matter of Example 27, generation of the adversarial image that is misclassified by the first DNN comprising instructions that, in response to being executed at the computing device, cause the computing device to utilize an evolution algorithm to alter the one or more portions of the base image to generate the test image.

Example 38 includes the subject matter of Example 37, the evolution algorithm to utilize a multi-dimensional archive of phenotypic elites.

Example 39 includes the subject matter of Example 27, generation of the adversarial image that is misclassified by the first DNN comprising instructions that, in response to being executed at the computing device, cause the computing device to minimize a Chebyshev or L-infinity distance between the base image and the test image when the one or more portions of the base image are altered to generate the test image.

Example 40 includes the subject matter of Example 26, the first and second DNNs trained to detect malware.

Example 41 includes the subject matter of Example 26, at least one sample image in the first training set generated from bytecode.

Example 42 includes the subject matter of Example 41, comprising instructions, that in response to being executed at the computing device, cause the computing device to translate the bytecode into pixel intensity to generate the at least one sample image in the first training set.

Example 43 includes the subject matter of Example 41, the bytecode comprising malware bytecode.

Example 44 includes the subject matter of Example 26, comprising instructions, that in response to being executed at the computing device, cause the computing device to: generate a second adversarial image that is misclassified by the second DNN; determine a third training set, the third training set to include the second adversarial image that is misclassified by the second DNN and one or more portions of the second training set; and provide the third training set to train a third DNN.

Example 45 includes the subject matter of Example 44, the one or more portions of the second training set to include the adversarial image that is misclassified by the first DNN.

Example 46 includes the subject matter of Example 44, the one or more portions of the second training set to include at least one of the one or more sample images in the first training set.

Example 47 includes the subject matter of Example 26, the first and second DNNs to utilize a multilayer perceptron architecture.

Example 48 includes the subject matter of Example 47, comprising instructions, that in response to being executed at the computing device, cause the computing device to alter a number of layers in the multilayer perceptron architecture.

Example 49 includes the subject matter of Example 26, the first and second DNNs to utilize a convolutional neural network architecture.

Example 50 includes the subject matter of Example 49, comprising instructions, that in response to being executed at the computing device, cause the computing device to alter a filter size in the convolutional neural network.

Example 51 is a computer-implemented method, comprising: generating an adversarial image that is misclassified by a first deep neural network (DNN), the first DNN trained with a first training set of one or more sample images; determining a second training set, the second training set to include the adversarial image that is misclassified by the first DNN and one or more portions of the first training set of one or more sample images; and providing the second training set to train a second DNN.

Example 52 includes the subject matter of Example 51, generation of the adversarial image that is misclassified by the first DNN comprising: altering one or more portions of a base image to generate a test image; providing the test image to the first DNN for classification; and identifying the test image as the adversarial image that is misclassified by the first DNN when classification of the test image is different from a target classification.

Example 53 includes the subject matter of Example 52, generation of the adversarial image that is misclassified by the first DNN comprising identifying the test image as the adversarial image that is misclassified by the first DNN when classification of the test image is different from the target classification and the classification of the test image is associated with a confidence level that satisfies a threshold confidence level.

Example 54 includes the subject matter of Example 52, generation of the adversarial image that is misclassified by the first DNN comprising altering one or more portions of the test image when classification of the test image is the same as the target classification.

Example 55 includes the subject matter of Example 52, comprising altering one or more portions of bytecode in an assembly file used to generate the base image based on the one or more altered portions of the base image when classification of the test image is different from the target classification.

Example 56 includes the subject matter of Example 55, comprising identifying the one or more portions of the bytecode to alter based on a sliding window technique.

Example 57 includes the subject matter of Example 56, the sliding window technique to utilize the one or more altered portions of the base image and the base image.

Example 58 includes the subject matter of Example 52, the base image comprising a sample image in the first training set and the target classification comprising a classification of the sample image.

Example 59 includes the subject matter of Example 58, wherein the base image and the test image are close according to a distance metric.

Example 60 includes the subject matter of Example 52, the target classification comprising a classification that is associated with white noise, a classification that is different from any classification associated with the first training set, or a classification of unclassifiable.

Example 61 includes the subject matter of Example 52, generation of the adversarial image that is misclassified by the first DNN comprising utilizing a fast gradient sign method to alter the one or more portions of the base image to generate the test image.

Example 62 includes the subject matter of Example 52, generation of the adversarial image that is misclassified by the first DNN comprising utilizing an evolution algorithm to alter the one or more portions of the base image to generate the test image.

Example 63 includes the subject matter of Example 62, the evolution algorithm to utilize a multi-dimensional archive of phenotypic elites.

Example 64 includes the subject matter of Example 52, generation of the adversarial image that is misclassified by the first DNN comprising minimizing a Chebyshev or L-infinity distance between the base image and the test image when the one or more portions of the base image are altered to generate the test image.

Example 65 includes the subject matter of Example 51, the first and second DNNs trained to detect malware.

Example 66 includes the subject matter of Example 51, at least one sample image in the first training set generated from bytecode.

Example 67 includes the subject matter of Example 66, comprising translating the bytecode into pixel intensity to generate the at least one sample image in the first training set.

Example 68 includes the subject matter of Example 66, the bytecode comprising malware bytecode.

Example 69 includes the subject matter of Example 51, comprising: generating a second adversarial image that is misclassified by the second DNN; determining a third training set, the third training set to include the second adversarial image that is misclassified by the second DNN and one or more portions of the second training set; and providing the third training set to train a third DNN.

Example 70 includes the subject matter of Example 69, the one or more portions of the second training set including the adversarial image that is misclassified by the first DNN.

Example 71 includes the subject matter of Example 69, the one or more portions of the second training set including at least one of the one or more sample images in the first training set.

Example 72 includes the subject matter of Example 51, the first and second DNNs to utilize a multilayer perceptron architecture.

Example 73 includes the subject matter of Example 72, comprising altering a number of layers in the multilayer perceptron architecture.

Example 74 includes the subject matter of Example 51, the first and second DNNs to utilize a convolutional neural network architecture.

Example 75 includes the subject matter of Example 74, comprising altering a filter size in the convolutional neural network.

Example 75 includes the subject matter of Example 74, comprising altering a filter size in the convolutional neural network.

Examples 76 is an apparatus to perform analytical attacks, the apparatus comprising: means for generating an adversarial image that is misclassified by a first deep neural network (DNN), the first DNN trained with a first training set of one or more sample images; means for determining a second training set, the second training set to include the adversarial image that is misclassified by the first DNN and one or more portions of the first training set of one or more sample images; and means for providing the second training set to train a second DNN.

Example 77 includes the subject matter of Example 76, generation of the adversarial image that is misclassified by the first DNN comprising: means for altering one or more portions of a base image to generate a test image; means for providing the test image to the first DNN for classification; and means for identifying the test image as the adversarial image that is misclassified by the first DNN when classification of the test image is different from a target classification.

Example 78 includes the subject matter of Example 77, generation of the adversarial image that is misclassified by the first DNN comprising means for identifying the test image as the adversarial image that is misclassified by the first DNN when classification of the test image is different from the target classification and the classification of the test image is associated with a confidence level that satisfies a threshold confidence level.

Example 79 includes the subject matter of Example 77, generation of the adversarial image that is misclassified by the first DNN comprising means for altering one or more portions of the test image when classification of the test image is the same as the target classification.

Example 80 includes the subject matter of Example 77, comprising means for altering one or more portions of bytecode in an assembly file used to generate the base image based on the one or more altered portions of the base image when classification of the test image is different from the target classification.

Example 81 includes the subject matter of Example 80, comprising means for identifying the one or more portions of the bytecode to alter based on a sliding window technique.

Example 82 includes the subject matter of Example 81, the sliding window technique to utilize the one or more altered portions of the base image and the base image.

Example 83 includes the subject matter of Example 77, the base image comprising a sample image in the first training set and the target classification comprising a classification of the sample image.

Example 84 includes the subject matter of Example 83, wherein the base image and the test image are close according to a distance metric.

Example 85 includes the subject matter of Example 77, the target classification comprising a classification that is associated with white noise, a classification that is different from any classification associated with the first training set, or a classification of unclassifiable.

Example 86 includes the subject matter of Example 77, generation of the adversarial image that is misclassified by the first DNN comprising means for utilizing a fast gradient sign method to alter the one or more portions of the base image to generate the test image.

Example 87 includes the subject matter of Example 77, generation of the adversarial image that is misclassified by the first DNN comprising means for utilizing an evolution algorithm to alter the one or more portions of the base image to generate the test image.

Example 88 includes the subject matter of Example 87, the evolution algorithm to utilize a multi-dimensional archive of phenotypic elites.

Example 89 includes the subject matter of Example 77, generation of the adversarial image that is misclassified by the first DNN comprising means for minimizing a Chebyshev or L-infinity distance between the base image and the test image when the one or more portions of the base image are altered to generate the test image.

Example 90 includes the subject matter of Example 76, the first and second DNNs trained to detect malware.

Example 91 includes the subject matter of Example 76, at least one sample image in the first training set generated from bytecode.

Example 92 includes the subject matter of Example 91, comprising means for translating the bytecode into pixel intensity to generate the at least one sample image in the first training set.

Example 93 includes the subject matter of Example 91, the bytecode comprising malware bytecode.

Example 94 includes the subject matter of Example 76, comprising: means for generating a second adversarial image that is misclassified by the second DNN; means for determining a third training set, the third training set to include the second adversarial image that is misclassified by the second DNN and one or more portions of the second training set; and means for providing the third training set to train a third DNN.

Example 95 includes the subject matter of Example 94, the one or more portions of the second training set including the adversarial image that is misclassified by the first DNN.

Example 96 includes the subject matter of Example 94, the one or more portions of the second training set including at least one of the one or more sample images in the first training set.

Example 97 includes the subject matter of Example 76, the first and second DNNs to utilize a multilayer perceptron architecture.

Example 98 includes the subject matter of Example 97, comprising means for altering a number of layers in the multilayer perceptron architecture.

Example 99 includes the subject matter of Example 76, the first and second DNNs to utilize a convolutional neural network architecture.

Example 100 includes the subject matter of Example 99, comprising means for altering a filter size in the convolutional neural network.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
   circuitry; and
   a memory device coupled to the circuitry, the memory device to store instructions that when executed by the circuitry cause the circuitry to:
      modify at least a first pixel of a base image to generate an adversarial image;
      present the adversarial image to a neural network (NN) to classify;
      determine whether the NN classified the adversarial image into a classification associated with the base image; and
      train the NN with the training set comprising the adversarial image based on a determination that the NN did not classify the adversarial image into the classification associated with the base image.

2. The apparatus of claim 1, the memory device comprising instructions that when executed by the circuitry cause the apparatus to:
   modify at least a second pixel of the base image to generate a second adversarial image;
determine whether the NN incorrectly classified the adversarial image;
   present the second adversarial image to the NN to classify; and
determine whether the NN classified the second adversarial image into the classification associated with the base image.

3. The apparatus of claim 2, the memory device comprising instructions that when executed by the circuitry cause the apparatus to train the NN with the training set comprising the adversarial image and the second adversarial image based on a determination that the NN did not classify the second adversarial image into the classification associated with the base image.

4. The apparatus of claim 1, the memory device comprising instructions that when executed by the circuitry cause the apparatus to utilize a fast gradient sign method to modify the at least the first pixel of the base image.

5. The apparatus of claim 1, the memory device comprising instructions that when executed by the circuitry cause the apparatus to minimize a Chebyshev or L-infinity distance between the base image and the adversarial image.

6. An apparatus, comprising:
   circuitry; and
   a memory device coupled to the circuitry, the memory device to store instructions that when executed by the circuitry cause the circuitry to:
      identify at least a first pixel of a base image based on a sliding window technique, wherein the sliding window technique is used to combine portions of the base image with the at least first pixel of the base image based on a sliding window;
      modify the at least first pixel of the base image to geneerate an adversarial image, the adversarial image misclassified by a neural network (NN) into a classification not associated with the base image; and
      train the NN with a training set comprising the adversarial image based on a determination that the NN did not classify the adversarial image into the classification associated with the base image.

7. At least one non-transitory computer-readable medium comprising a set of instructions that in response to being executed at a computing device, cause the computing device to:
   modify at least a first pixel of a base image to generate an adversarial image;
   present the adversarial image to a neural network (NN) to classify;
   determine whether the NN classified the adversarial image into the classification associated with the base image; and
   train the NN with the training set comprising the adversarial image based on a determination that the NN did not classify the adversarial image into the classification associated with the base image.

8. The at least one non-transitory computer-readable medium of claim 7, comprising instructions, that in response to being executed at the computing device, cause the computing device to:
   modify at least a second pixel of the base image to generate a second adversarial image;
   determine whether the NN incorrectly classified the adversarial image;
   present the second adversarial image to the NN to classify; and
   determine whether the NN classified the second adversarial image into the classification associated with the base image.

9. The at least one non-transitory computer-readable medium of claim 8, comprising instructions, that in response to being executed at the computing device, cause the computing device to train the NN with the training set comprising the adversarial image and the second adversarial image based on a determination that the NN did not classify the second adversarial image into the classification associated with the base image.

10. The at least one non-transitory computer-readable medium of claim 7, comprising instructions, that in response to being executed at the computing device, cause the computing device to utilize a fast gradient sign method to modify the at least the first pixel of the base image.

11. The at least one non-transitory computer-readable medium of claim 7, comprising instructions, that in response to being executed at the computing device, cause the computing device to minimize a Chebyshev or L-infinity distance between the base image and the adversarial image.

12. At least one non-transitory computer-readable medium comprising a set of instructions that in response to being executed at a computing device, cause the computing device to:
  identify at least a first pixel of a base image based on a sliding window technique, wherein the sliding window technique is used to combine portions of the base image with the at least first pixel of the base image based on a sliding window;
  modify the at least first pixel of the base image to generate an adversarial image, the adversarial image misclassified by a neural network (NN) into a classification not associated with the base image; and
  train the NN with a training set comprising the adversarial image based on a determination that the NN did not classify the adversarial image into the classification associated with the base image.

13. An apparatus, comprising:
  circuitry; and
  a memory device coupled to the circuitry, the memory device to store instructions that when executed by the circuitry cause the circuitry to:
    modify at least one image of a first group of images of a training set for a neural network (NN) to form a plurality of adversarial images, the first group of images associated with a first classification of the NN;
    present at least one of the plurality of adversarial images to the NN to classify;
    determine the at least one of the plurality of adversarial images does not match the first classification; and
    train the NN with the at least one of the plurality of adversarial images based on the determination that the NN did not classify the at least one of the plurality of adversarial images into the first classification of the NN.

14. The apparatus of claim 13, the memory device comprising instructions that when executed by the circuitry cause the apparatus to:
  modify at least one image of a second group of images of the training set for the NN to form a second plurality of adversarial images, the second group of images associated with a second classification of the NN; and
  train the NN with the training set, at least one of the plurality of adversarial images, and at least one of the plurality of second adversarial images.

15. The apparatus of claim 14, the memory device comprising instructions that when executed by the circuitry cause the apparatus to:
  present the plurality of adversarial images to the NN to classify;
  determine, for each of the plurality of adversarial images, whether the NN classified the plurality of adversarial images into the first classification; and
  train the NN with the training set, the ones of the plurality of adversarial images that the NN did not classify into the first classification, and at least one of the plurality of second adversarial images.

16. The apparatus of claim 15, the memory device comprising instructions that when executed by the circuitry cause the apparatus to:
  present the plurality of second adversarial images to the NN to classify;
  determine, for each of the plurality of second adversarial images, whether the NN classified the plurality of second adversarial images into the second classification; and
  train the NN with the training set, the ones of the plurality of adversarial images that the NN did not classify into the first classification, and the ones of the plurality of second adversarial images that the NN did not classify into the second classification.

17. The apparatus of claim 13, the memory device comprising instructions that when executed by the circuitry cause the apparatus to utilize a fast gradient sign method to modify the at least one image of the first group of images.

18. The apparatus of claim 13, the memory device comprising instructions that when executed by the circuitry cause the apparatus to minimize a Chebyshev or L-infinity distance between the at least one image of the first group of images and the plurality of adversarial images.

19. A computer-implemented method, comprising:
  modifying at least one image of a first group of images of a training set for a neural network (NN) to form a plurality of adversarial images, the first group of images associated with a first classification of the NN, and the adversarial images not matching the first classification
  presenting at least one of the plurality of adversarial images to the NN to classify
  determining the at least one of the plurality of adversarial images does not match the first classification; and
  training the NN with the at least one of the plurality of adversarial images based on a determination that the NN did not classify the at least one of the plurality of adversarial images into the first classification of the NN.

20. The computer-implemented method of claim 19, comprising:
  modifying at least one image of a second group of images of the training set for the NN to form a second plurality of adversarial images, the second group of images associated with a second classification of the NN; and
  training the NN with the training set, at least one of the plurality of adversarial images, and at least one of the plurality of second adversarial images.

21. The computer-implemented method of claim 20, comprising:
  presenting the plurality of adversarial images to the NN to classify;
  determining, for each of the plurality of adversarial images, whether the NN classified the plurality of adversarial images into the first classification; and
  training the NN with the training set, the ones of the plurality of adversarial images that the NN did not classify into the first classification, and at least one of the plurality of second adversarial images.

22. The computer-implemented method of claim 21, comprising:
  presenting the plurality of second adversarial images to the NN to classify;
  determining, for each of the plurality of second adversarial images, whether the NN classified the plurality of second adversarial images into the second classification; and training the NN with the training set, the ones of the plurality of adversarial images that the NN did not classify into the first classification, and the ones of the plurality of second adversarial images that the NN did not classify into the second classification.

23. The computer-implemented method of claim 19, comprising minimizing a Chebyshev or L-infinity distance between the at least one image of the first group of images and the plurality of adversarial images.

* * * * *